(12) United States Patent
Kokenda et al.

(10) Patent No.: US 10,707,631 B2
(45) Date of Patent: *Jul. 7, 2020

(54) BUSWAY SYSTEMS AND RELATED ASSEMBLIES AND METHODS

(71) Applicant: Eaton Intelligent Power Limited, Dublin (IE)

(72) Inventors: John Michael Kokenda, Greenwood, SC (US); David Ladd Kelley, Greenwood, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,131

(22) Filed: Aug. 30, 2019

(65) Prior Publication Data

US 2019/0386443 A1 Dec. 19, 2019

Related U.S. Application Data

(63) Continuation of application No. 16/205,735, filed on Nov. 30, 2018, now Pat. No. 10,404,023, which is a (Continued)

(51) Int. Cl.
*H02G 5/00* (2006.01)
*H01R 25/16* (2006.01)
(Continued)

(52) U.S. Cl.
CPC ......... *H01R 25/162* (2013.01); *H01R 25/145* (2013.01); *H02G 5/00* (2013.01);
(Continued)

(58) Field of Classification Search
CPC .......... H02G 5/002; H02G 5/007; H02G 5/04; H01R 25/145
See application file for complete search history.

(56) References Cited

U.S. PATENT DOCUMENTS 3,104,276 A 9/1963 Cataldo et al.
3,187,086 A 6/1965 Moodie et al.
(Continued)

FOREIGN PATENT DOCUMENTS

DE 2119572 11/1972
DE 2123152 11/1972
(Continued)

OTHER PUBLICATIONS

Starline Track Busway, Busway Series B60, B100C, B160, B225, Products, Components and Accessories, Universal Electric Corporation, www.uecorp.com, Cat. No. 1-01, available as of filing date.

*Primary Examiner* — Tho D Ta
(74) *Attorney, Agent, or Firm* — Myers Bigel, P.A.

(57) ABSTRACT

A busway assembly includes first and second busway sections and a joint assembly connecting the first and second sections. Each busway section includes a housing including first and second opposing side portions. Each busway section includes a first insulator held in the first side portion and a second insulator held in the second side portion. The first and second insulators each hold one or more bus bar conductors. The joint assembly includes first and second connected joint housings and plurality of joint conductors held in the first and second housings. A first exposed portion of each joint conductor extends out of the first housing and is electrically connected with one of the bus bar conductors of the first busway section. A second exposed portion of each joint conductor extends out of the second housing and is electrically connected with one of the bus bar conductors of the second busway section.

20 Claims, 14 Drawing Sheets

Related U.S. Application Data continuation of application No. 15/626,900, filed on Jun. 19, 2017, now Pat. No. 10,164,388, which is a continuation of application No. 15/216,539, filed on Jul. 21, 2016, now Pat. No. 9,711,922, which is a continuation of application No. 14/688,307, filed on Apr. 16, 2015, now Pat. No. 9,407,079.

(51) Int. Cl.
*H01R 25/14* (2006.01)
*H02G 5/04* (2006.01)

(52) U.S. Cl.
CPC .............. *H02G 5/002* (2013.01); *H02G 5/007* (2013.01); *H02G 5/04* (2013.01)

(56) References Cited

U.S. PATENT DOCUMENTS

| | | | |
|---|---|---|---|
| 3,365,537 A | 1/1968 | Fehr, Jr. et al. | |
| 3,531,758 A | 9/1970 | Blumkin | |
| 3,559,146 A | 1/1971 | Valtonen | |
| 3,609,215 A * | 9/1971 | Giger, Jr. ............... | H02G 5/007 174/88 B |
| 3,718,816 A | 2/1973 | Seelbach et al. | |
| 3,737,834 A | 6/1973 | Contratto | |
| 3,801,951 A | 4/1974 | Kemmerer et al. | |
| 3,813,633 A | 5/1974 | Clement | |
| 3,832,503 A | 8/1974 | Crane | |
| 3,848,715 A | 11/1974 | Hesse | |
| 3,894,170 A | 7/1975 | Schinzel | |
| 3,933,403 A | 1/1976 | Rubesamen et al. | |
| 3,973,818 A | 8/1976 | Soquenne | |
| 4,032,208 A | 6/1977 | Berkenhoff | |
| 4,163,595 A | 8/1979 | Vasseur | |
| 4,627,680 A | 12/1986 | Weimer et al. | |
| 4,655,520 A | 4/1987 | Cummings | |
| 4,676,567 A | 6/1987 | Mouchi | |
| 4,822,292 A | 4/1989 | Thayer et al. | |
| 4,919,625 A | 4/1990 | Coutre | |
| 4,950,841 A | 8/1990 | Walker et al. | |
| 5,092,787 A | 3/1992 | Wise et al. | |
| 5,141,448 A | 8/1992 | Mattingly et al. | |
| 5,760,339 A | 6/1998 | Faulkner et al. | |
| 5,785,542 A | 7/1998 | Johnson | |
| 5,811,733 A | 9/1998 | Flaig | |
| 5,821,464 A * | 10/1998 | Graham ................. | H02G 5/007 174/86 |
| 6,033,239 A | 3/2000 | Jaakkola et al. | |
| 6,039,584 A | 3/2000 | Ross | |
| 6,105,741 A | 8/2000 | Ross | |
| 6,146,169 A | 11/2000 | Calder et al. | |
| 6,176,711 B1 * | 1/2001 | Rohr .................... | H01R 25/145 439/110 |
| 6,203,339 B1 | 3/2001 | Nieminen | |
| 6,296,498 B1 | 10/2001 | Ross | |
| 6,358,070 B1 | 3/2002 | Lin | |
| 6,517,363 B2 | 2/2003 | Ross | |
| 6,521,837 B2 | 2/2003 | Hilgert et al. | |
| 6,884,095 B1 | 4/2005 | Tsai | |
| 7,455,535 B2 | 11/2008 | Insalaco et al. | |
| 7,614,895 B2 | 11/2009 | Jur et al. | |
| 7,718,895 B2 | 5/2010 | Rodriguez | |
| 7,744,386 B1 | 6/2010 | Speidel et al. | |
| 7,819,676 B1 | 10/2010 | Cardoso et al. | |
| 7,819,681 B1 | 10/2010 | Rodrigues et al. | |
| 8,469,727 B2 * | 6/2013 | Lindenau ............. | H01R 25/145 439/115 |
| 8,506,310 B2 | 8/2013 | Brandberg | |
| 8,540,526 B2 | 9/2013 | Mooney et al. | |
| 8,550,830 B1 | 10/2013 | Bhathija et al. | |
| 8,664,530 B2 | 3/2014 | Ross et al. | |
| 8,697,993 B2 | 4/2014 | Jur et al. | |
| 8,899,999 B2 | 12/2014 | MacKiewicz | |
| 8,900,002 B2 * | 12/2014 | Mooney .................. | H01R 4/60 439/212 |
| 9,190,791 B1 | 11/2015 | Jaena et al. | |
| 9,197,045 B2 | 11/2015 | Jur et al. | |
| 9,275,774 B2 | 3/2016 | Ross et al. | |
| 9,379,502 B2 | 6/2016 | Davidson, Jr. et al. | |
| 9,520,688 B2 | 12/2016 | Sheridan et al. | |
| 9,520,703 B2 | 12/2016 | Jaena et al. | |
| 9,608,392 B1 | 3/2017 | Destro | |
| 9,673,583 B2 | 6/2017 | Hudson et al. | |
| 9,690,162 B2 | 6/2017 | Wilbur et al. | |
| 9,698,548 B2 * | 7/2017 | Jaena ................... | H01R 25/162 |
| 10,122,131 B2 | 11/2018 | Stevens et al. | |
| 10,404,023 B2 * | 9/2019 | Kokenda ............. | H01R 25/145 |
| 2007/0212932 A1 | 9/2007 | Jur et al. | |
| 2008/0090432 A1 | 4/2008 | Patterson et al. | |
| 2015/0236462 A1 | 8/2015 | Davidson, Jr. et al. | |
| 2016/0049759 A1 | 2/2016 | Jaena et al. | |
| 2016/0104985 A1 | 4/2016 | Ewing et al. | |
| 2016/0344148 A1 | 11/2016 | Mullins et al. | |
| 2016/0372909 A1 | 12/2016 | Baldwin et al. | |
| 2017/0170616 A1 | 6/2017 | Wynnik et al. | |

FOREIGN PATENT DOCUMENTS

| | | |
|---|---|---|
| DE | 2131065 | 1/1973 |
| DE | 3025913 | 2/1982 |
| EP | 1956688 | 8/2008 |

* cited by examiner

BUSWAY SYSTEMS AND RELATED ASSEMBLIES AND METHODS

RELATED APPLICATIONS

This application is a continuation of U.S. patent application Ser. No. 16/205,735, filed Nov. 30, 2018, which is a continuation of U.S. patent application Ser. No. 15/626,900, filed Jun. 19, 2017, which is a continuation of U.S. patent application Ser. No. 15/216,539, filed on Jul. 21, 2016, which is a continuation of U.S. patent application Ser. No. 14/688,307, filed on Apr. 16, 2015, the disclosures of which are incorporated by reference in their entireties.

BACKGROUND

Busway systems typically include several elongated busway sections with busway joints between adjacent busway sections. The busway joint serves to electrically and mechanically connect the adjacent busway sections. Continuous plug-in busway systems allow for plug-in devices (e.g., outlet boxes) to be installed anywhere or substantially anywhere along the length of the busway sections.

SUMMARY

Some embodiments of the invention are directed to a busway assembly. The busway assembly includes first and second busway sections and a joint assembly between and connecting the first and second busway sections. Each busway section includes a housing. The housing has a length and includes first and second opposing side portions. Each busway section includes a first insulator held in the first side portion of the housing and a second insulator held in the second side portion of the housing. Each of the first and second insulators have a length that is substantially the same as the length of the housing. Each of the first and second insulators hold one or more bus bar conductors. The joint assembly includes first and second connected joint housings and plurality of joint conductors held in the first and second joint housings. A first exposed portion of each joint conductor extends out of the first joint housing and is electrically connected with one of the bus bar conductors of the first busway section. A second exposed portion of each joint conductor extends out of the second joint housing and is electrically connected with one of the bus bar conductors of the second busway section.

In some embodiments, the first and second joint housings each include a base and a plurality of elongated conductor holding members extending away from the base, with each conductor holding member defining a channel. The first and second joint housings are connected at their respective bases with the channels of the first joint housing aligned with the channels of the second joint housing and with each joint conductor held in a respective pair of aligned channels of the first and second joint housings.

Each conductor holding member may include a slot at a distal end portion thereof, with the exposed portions of the joint conductor extending through the slots. The bus bar conductors may be held in spaced apart channels defined in the first and second busway section insulators with an opening extending along each channel. The exposed portions of the joint conductors may be received in the openings to electrically connect with the bus bar conductors.

In some embodiments, the first and second joint housings each include a plurality of block members extending away from the base, with one each positioned adjacent at least some of the conductor holding members. A respective bus bar conductor may have a length that is shorter than a length of the channel in which the bus bar conductor is held such that a gap is defined in the channel between an end of the bus bar conductor and an end of the channel. A respective block member of the first joint housing may be received in the gap of one of the channels of the first busway section insulators such that an end of the block member is adjacent and/or abuts an end of the bus bar conductor held in the channel. A respective block member of the second joint housing may be received in the gap of one of the channels of the second busway section insulators such that an end of the block member is adjacent and/or abuts an end of the bus bar conductor held in the channel. A respective block member may be adjacent and extend along a portion of one of the joint conductors.

The busway assembly may further include a joint cover over the joint assembly, with the joint cover being slidable axially along the first and second busway section housings. The busway section housings may include channels at the first and second side portions thereof, and the joint cover may include rail members that are slidably received in the channels.

Some other embodiments of the invention are directed to a method including providing a first busway section and a joint assembly. The first busway section includes a busway section housing having a length, with the housing including first and second opposing side portions. A first insulator is held in the first side portion of the housing, with the first insulator having a length that is substantially the same as the length of the housing, and with the first insulator holding one or more bus bar conductors. A second insulator is held in the second side portion of the housing, with the second insulator having a length that is substantially the same as the length of the housing, and with the second insulator holding one or more bus bar conductors. The joint assembly includes first and second connected joint housings and a plurality of joint conductors held in the first and second joint housings. Each joint conductor has a first exposed portion extending from the first joint housing and a second exposed portion extending from the second joint housing. The method includes joining the first busway section and the joint assembly such that the first exposed portion of each joint conductor is electrically connected with one of the bus bar conductors of the first busway section.

In some embodiments, each of the first and second joint housings includes a base and a plurality of elongated conductor holding members extending away from the base, with each joint conductor held in aligned conductor holding members of the first and second housings and having the first exposed portion at a distal end of the conductor holding member of the first housing and the second exposed portion at a distal end portion of the conductor holding member of the second housing. The bus bar conductors may be held in spaced apart channels defined in the first and second busway section insulators with an opening extending along each channel. Joining the first busway section and the joint assembly may include receiving the first exposed portions of the joint conductors in the openings of the first busway section insulators to electrically connect with the first busway section bus bar conductors.

The first and second joint housings may each include a plurality of block members extending away from the base, with one each positioned adjacent at least some of the conductor holding members. Joining the first busway section and the joint assembly may include slidingly receiving the block members of the first joint housing in the channels of the first busway section insulators such that an end of a respective block member is adjacent and/or abuts an end of one of the conductors held in one of the channels.

In some embodiments, the method includes providing a second busway section. The second busway section includes a busway section housing having a length, with the housing including first and second opposing side portions. A first insulator is held in the first side portion of the housing, with the first insulator having a length that is substantially the same as the length of the housing, and with the first insulator holding one or more bus bar conductors. A second insulator is held in the second side portion of the housing, with the second insulator having a length that is substantially the same as the length of the housing, and with the second insulator holding one or more bus bar conductors. The method includes joining the second busway section and the joint assembly such that the second exposed portion of each joint conductor is electrically connected with one of the bus bar conductors of the second busway section.

Joining the second busway section and the joint assembly may include receiving the second exposed portions of the joint conductors in the openings of the second busway section insulators to electrically connect with the bus bar conductors of the second busway section. Joining the second busway section and the joint assembly may include slidingly receiving the block members of the second joint housing in the channels of the second busway section insulators such that an end of a respective block member is adjacent and/or abuts an end of one of the conductors held in one of the channels.

In some embodiments, the method includes, before joining the second busway section and the joint assembly, slidably receiving a joint cover on the first busway section housing. In some embodiments, the method includes, after joining the second busway section and the joint assembly, sliding and tightening the joint cover over the joint assembly.

Some other embodiments of the invention are directed to a busway section. The busway section includes a housing having a length and including first and second opposing side portions. The busway section includes a first insulator configured to be slidingly received in the first side portion of the housing and a second insulator configured to be slidingly received in the second side portion of the housing. Each of the first and second insulators has a length that is substantially the same as the length of the housing. Each of the first and second insulators includes a plurality of spaced apart channels extending lengthwise in the insulator, with each channel configured to receive a bus bar conductor. The housing further includes a plurality of insulator alignment and engagement features configured to align and guide the first and second insulators as they are slidingly received in the housing and to hold the first and second insulators in place after they are slidingly received in the housing.

In some embodiments, the insulator alignment and engagement features include a first upper standoff track extending downwardly and inwardly from the first side portion of the housing and a first lower standoff track extending upwardly and inwardly from the first side portion of the housing. The first upper standoff track is configured to engage an upper portion of the first insulator, and the first lower standoff track is configured to engage a lower portion of first insulator. The insulator alignment and engagement features include a second upper standoff track extending downwardly and inwardly from the second side portion of the housing and a second lower standoff track extending upwardly and inwardly from the second side portion of the housing. The second upper standoff track is configured to engage an upper portion of the second insulator, and the second lower standoff track is configured to engage a lower portion of second insulator.

In some embodiments, the insulator alignment and engagement features include first inner wall member extending inwardly at the first side portion of the housing and a second inner wall member extending inwardly at the second side portion of the housing. The first inner wall member is positioned to be adjacent to and/or abut a central portion of the first insulator. The second inner wall member is positioned to be adjacent to and/or abut a central portion of the second insulator. One or more gaps may be defined between the first inner wall member and the first insulator and/or one or more gaps may be defined between the second inner wall member and the second insulator.

The insulator alignment and engagement features may include first and second upper leg members. The first upper leg member may extend upwardly from the first inner wall member and may be configured to be received in a groove in an upper portion of the first insulator. The second upper leg member may extend upwardly from the second inner wall member and may be configured to be received in a groove in an upper portion of the second insulator.

The insulator alignment and engagement features may include first and second lower leg members. The first lower leg member may extend downwardly from the first inner wall member and may be configured to be received in a groove in a lower portion of the first insulator. The second lower leg member may extend downwardly from the second inner wall member and may be configured to be received in a groove in a lower portion of the second insulator.

The insulator alignment and engagement features may include a first upper wall portion above and offset from the first inner wall member and a second upper wall portion above and offset from the second inner wall member. An upper ledge of the first insulator may be received above the first inner wall member and adjacent the first upper wall portion. An upper ledge of the second insulator may be received above the second inner wall member and adjacent the second upper wall portion.

The insulator alignment and engagement features may include a first lower wall portion below and offset from the first inner wall member and a second lower wall portion below and offset from the second inner wall member. A lower ledge of the first insulator may be received below the first inner wall member and adjacent the first lower wall portion. A lower ledge of the second insulator may be received below the second inner wall member and adjacent the second lower wall portion.

In some embodiments, each of the first and second side portions of the housing includes a joint cover engagement feature configured to slidably engage a joint cover. The joint cover engagement feature may include a first channel at the first side portion of the housing and a second channel at the second side portion of the housing. The first and second channels may be configured to slidingly receive a joint cover.

In some embodiments, the housing further includes a first lower ledge extending inwardly from a lower portion of the first side portion of the housing and a second lower ledge extending inwardly from a lower portion of the second side portion of the housing. The insulator alignment and engagement features may include a first lower lip that extends upwardly from a distal edge of the first lower ledge and a second lower lip that extends upwardly from a distal edge of the second lower ledge. The first lower lip may be configured to be received in a slot in a lower portion of the first insulator and the second lower lip may be configured to be received in a slot in a lower portion of the second insulator.

The housing may include a first lower flange extending downwardly from the first lower ledge and a second lower flange extending downwardly from the second lower ledge. The busway section may include first and second lip seal members formed of an electrically insulative material. The first lip seal member may be configured to be received around the first lower flange and the second lip seal member may be configured to be received around the second lower flange.

In some embodiments, one of the first and second insulators comprises an enlarged channel configured to receive an enlarged neutral conductor.

Some other embodiments of the invention are directed to a joint assembly for use with a busway system. The joint assembly includes first and second insulator housings and a plurality of conductors held in aligned channels of the first and second insulator housings. The first and second insulator housings each include a base and a plurality of elongated conductor holding members extending away from the base. The first and second housings are coupled to one another at their respective bases with the channels of the first insulator housing aligned with the channels of the second insulator housing. The joint assembly includes at least one securing feature associated with first insulator housing and/or the second insulator housing such that the first and second insulators housings are secured to one another with one or more interference fits.

In some embodiments, the securing feature includes the channels that are sized and configured such that the conductors are held therein with an interference fit. The conductors and the channels may be generally T-shaped.

The securing feature may include a flange at the base of one of the first and second insulator housings that is sized and configured to receive the base of the other one of the first and second housings. The securing feature may include at least one receptacle on the base of one of the first and second insulator housings that is sized and configured to receive at least one plug member on the base of the other one of the first and second housings.

Some other embodiments of the invention are directed to a joint assembly. The joint assembly includes a first insulator housing including a base and a plurality conductor holding members extending away from the base, with each conductor holding member defining a channel and including an open slot at an end portion thereof. The joint assembly includes a second insulator housing including a base and a plurality conductor holding members extending away from the base, with each conductor holding member defining a channel and including an open slot at an end portion thereof. The joint assembly includes a plurality of conductors. The channels of the first and second housings are sized and configured to receive and hold the conductors. The first and second housings are configured to couple at their respective bases such that a respective conductor is substantially enclosed in aligned conductor holding members of the first and second housings and portions of the conductor are exposed through the slots of the aligned conductor holding members.

Some other embodiments of the invention are directed to a busway assembly kit including a busway section and a joint assembly. The busway section comprises a housing having a length and including first and second opposing side portions. The busway section includes a first insulator in the first side portion of the housing and a second insulator in the second side portion of the housing. Each of the first and second insulators has a length that is substantially the same as the length of the housing. Each of the first and second insulators includes a plurality of channels extending lengthwise along the insulator, with the insulator defining a plurality of lengthwise openings, one opening for each channel. The joint assembly includes first and second insulator housings and a plurality of conductors held in aligned channels of the first and second housings. The first and second housings each include a base and a plurality of conductor holding members extending outwardly from the base. The conductor holding members each define a channel. The first and second insulator housings are coupled at their respective bases such that the channels of the first insulator housing are aligned with the channels of the second insulator housing. Each conductor includes a first exposed portion that extends through a slot in the first insulator housing and a second exposed portion that extends through a slot in the second insulator housing. The joint assembly is configured to be coupled to the busway section with either the first exposed portions or the second exposed portions of the conductors received in at least some of the openings of the first and second insulators. The slots may be tapered such that the conductor holding members narrow as they extend away from the base of the first and second insulator housings.

DETAILED DESCRIPTION OF EMBODIMENTS OF THE INVENTION

Figure 1:
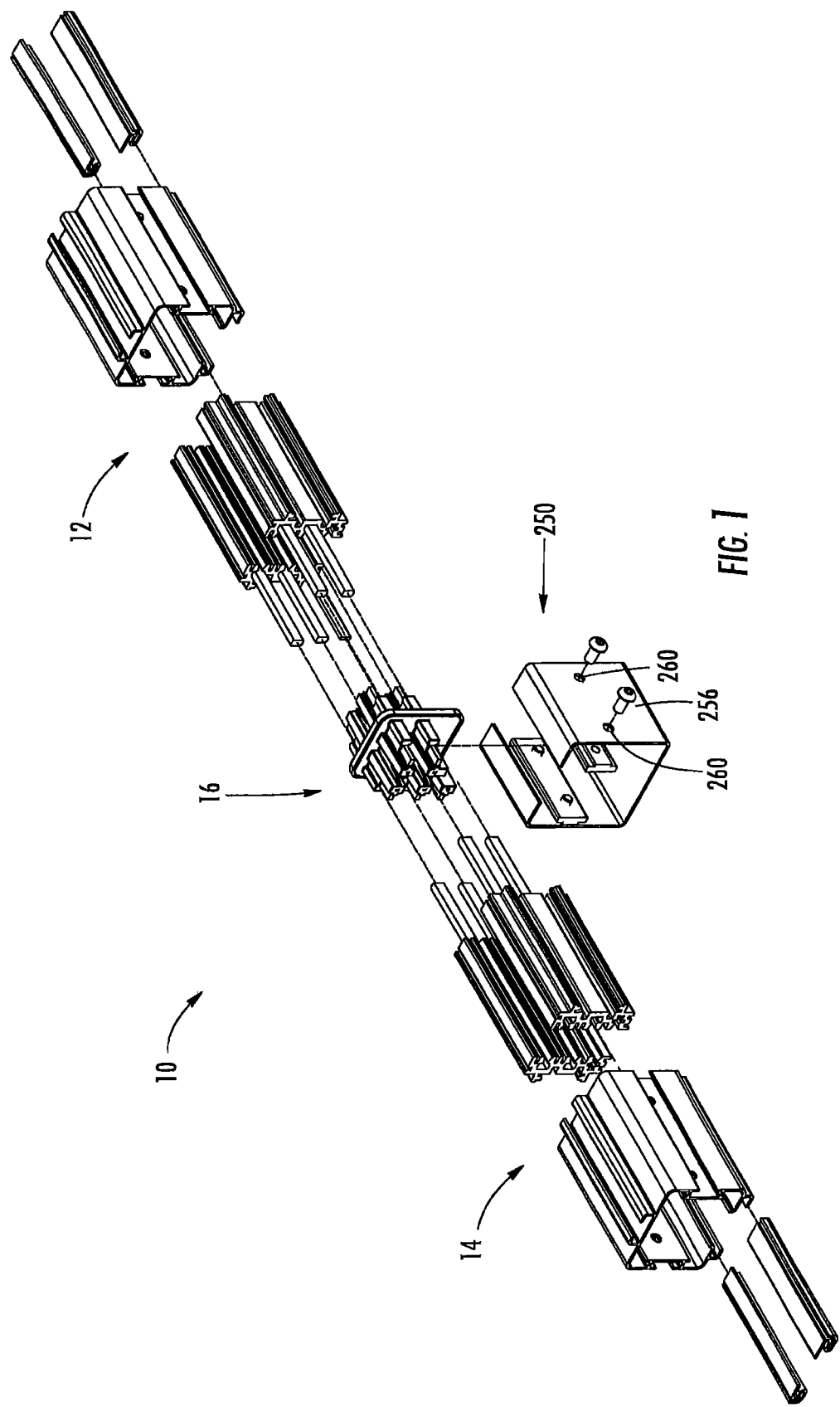
FIG. 1 is an exploded perspective view of a busway system according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner.

These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A busway or bus duct system assembly 10 is illustrated in FIG. 1. The busway assembly 10 includes first and second busway or bus duct sections 12, 14. A joint assembly 16 is disposed between the first and second busway sections 12, 14. The busway assembly 10 typically forms a portion of a larger busway system or busway run, and one or more additional busway sections, joint assemblies and/or other components may be included in the larger busway system.

Figure 2:
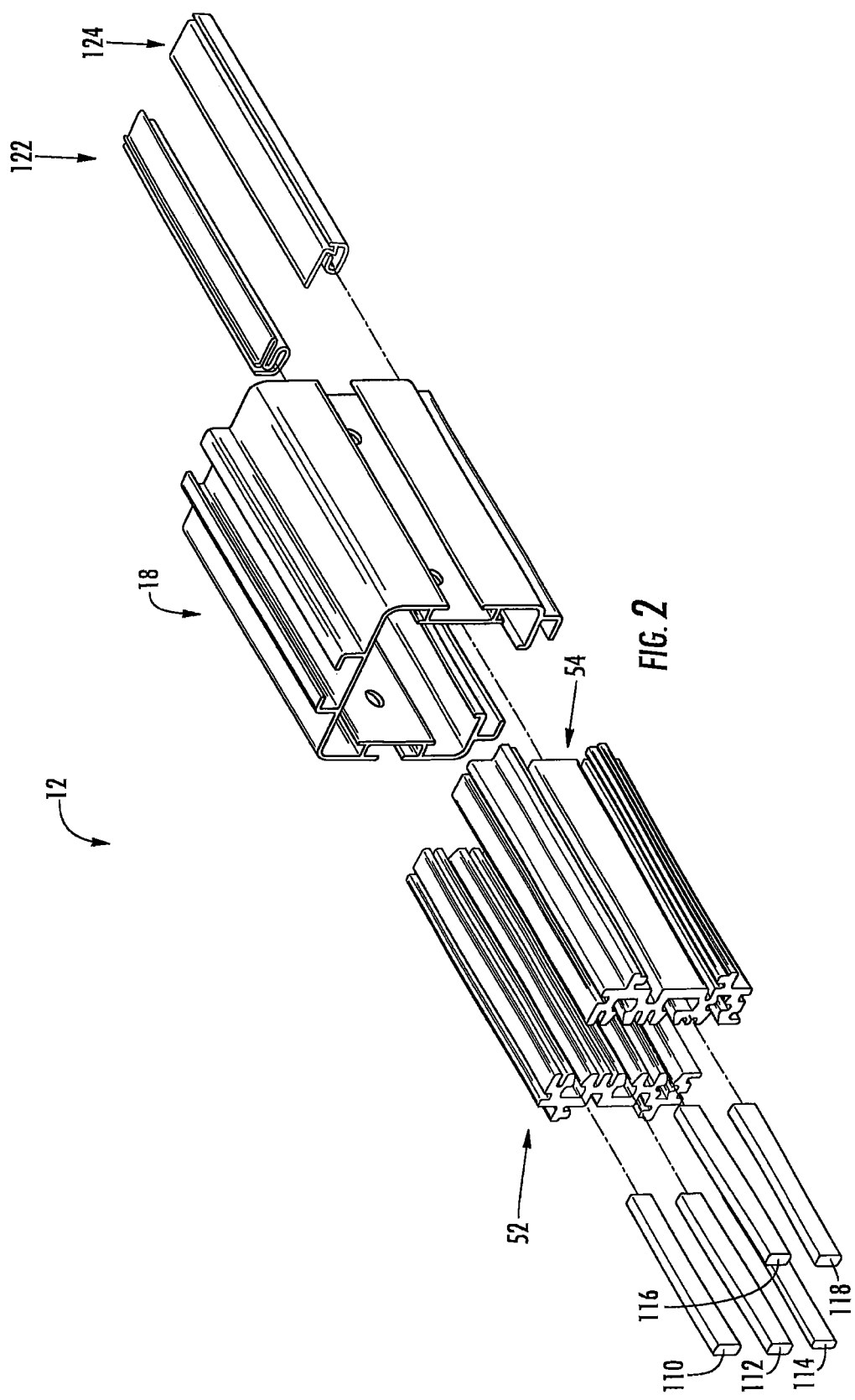
FIG. 2 is an exploded perspective view of a busway section according to some embodiments.

The busway section 12 is illustrated in FIG. 2. The busway section 14 has substantially the same structure as the busway section 12; accordingly, in the interest of brevity, only the busway section 12 will be described in detail below.

Figure 3:
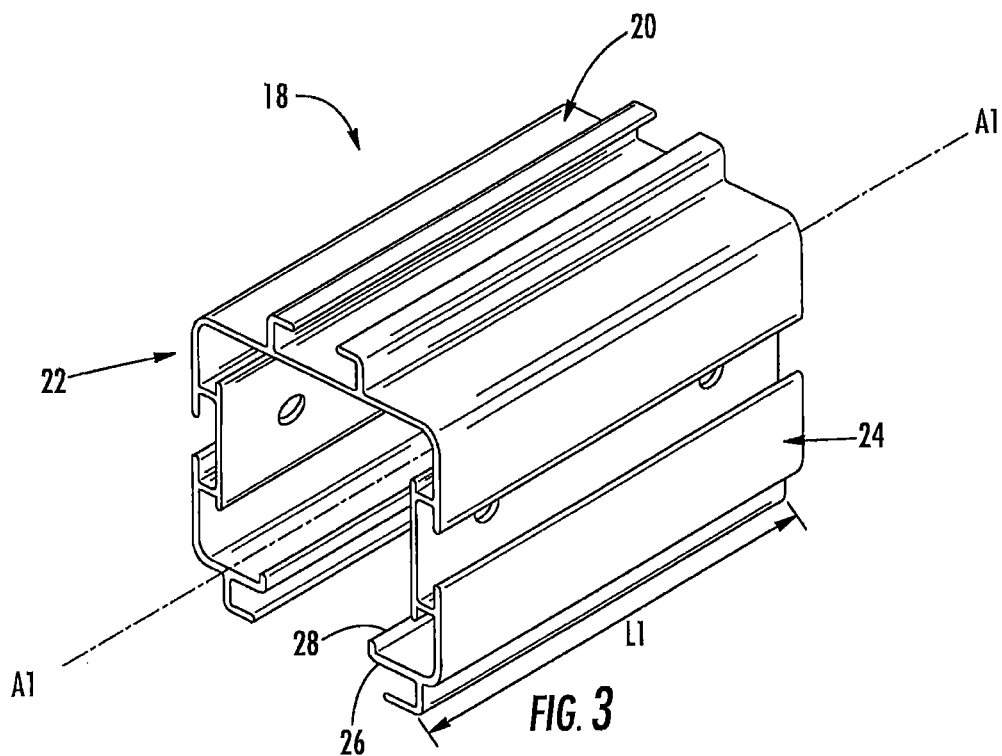
FIG. 3 is a perspective view of a housing of the busway section of FIG. 2.

The busway section 12 includes a housing 18. The housing 18 may be formed of aluminum, for example. Referring to FIG. 3, the housing 18 is elongated and defines a longitudinal axis A1. The housing 18 has a length L1. The length L1 may be between about 0.5 to 10 feet in various embodiments.

Figure 4:
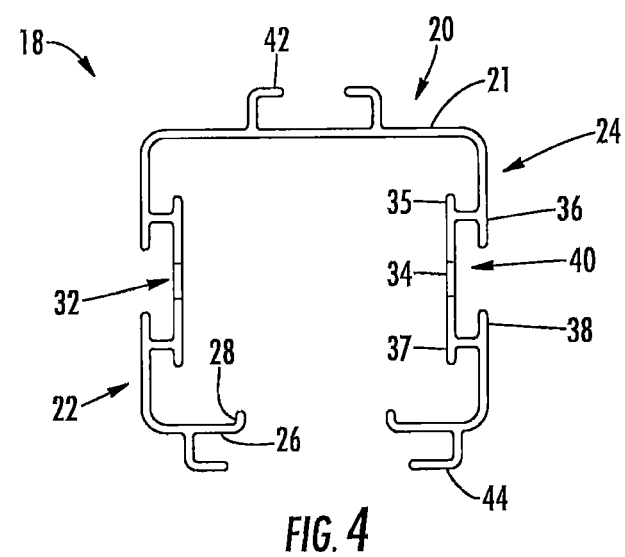
FIG. 4 is an end view of the housing of FIG. 3.

Referring to FIGS. 3 and 4, the housing 18 has a top or upper portion 20 and first and second opposing side portions 22, 24. A lower ledge 26 extends inwardly from each of the side portions 22, 24 and extends the length L1 of the housing 18. An upwardly extending lip 28 is at a distal edge of each ledge 26. The lips 28 may also be referred to as insulator alignment and/or engagement features.

The housing side portions 22, 24 each include a channel 32. The channel 32 is defined by an inner wall 34 and upper and lower opposite outer walls 36, 38. The inner walls 34 and the outer walls 36, 38 may also be referred to as insulator alignment and/or engagement features. An opening 40 to the channel 32 is defined between the upper and lower outer walls 36, 38. The channel 32 is sized and configured to slidably receive a joint cover assembly, as will be described in more detail below.

Extending from each of the housing inner walls 34 is a top or upper leg member 35 and a bottom or lower leg member 37. The upper and lower legs 35, 37 extend the length L1 of the housing 18 (FIG. 3). Each inner wall 34 and its corresponding upper and lower legs 35, 37 may collectively be referred to as an inner wall member of the housing.

The housing top portion 20 includes a pair of upper flanges 42 (e.g., generally L-shaped opposed flanges) that extend from a top or upper wall 21. The flanges 42 may be used for mounting or suspending the busway section 12. A lower flange 44 (e.g., a generally L-shaped flange) extends downwardly from each one of the ledges 26. The flanges 44 may be shaped and configured to receive finger safe seals as well as access barriers, as will be described in more detail below.

Referring again to FIG. 2, the busway section 12 includes first and second insulators 52, 54. The first and second insulators 52, 54 are received in the housing 18 at the first and second side portions 22, 24, respectively (FIGS. 3 and 4). The insulators 52, 54 are continuous and have the same length or about the same length as the length L1 of the housing (FIG. 3).

Figure 5:
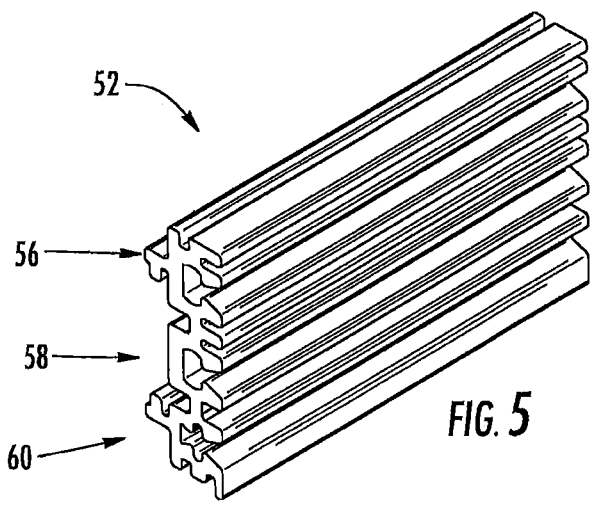
FIG. 5 is a perspective view of an insulator of the busway section of FIG. 2.
Figure 6:
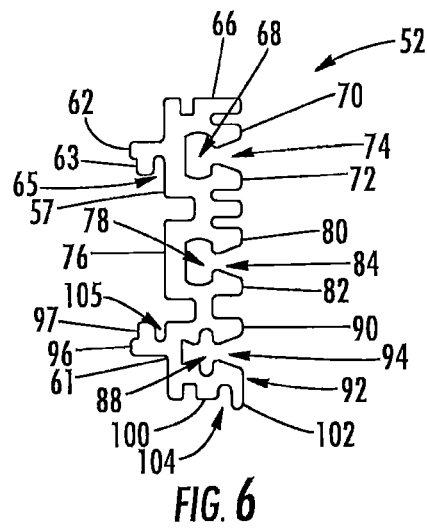
FIG. 6 is an end view of the insulator of FIG. 5.

A perspective view of the insulator 52 is shown in FIG. 5 and an end view of the insulator 52 is shown in FIG. 6. When viewed from the end, the insulator 54 is a mirror image of the insulator 52. Accordingly, in the interest of brevity, only the insulator 52 will be described in detail below.

Referring to FIGS. 5 and 6, the insulator 52 includes a top or upper portion 56, a central or middle portion 58 and a bottom or lower portion 60. The upper portion 56 includes an upper housing alignment and/or engagement feature, shown as an upper ledge 62 with a lip or projection 63 extending downwardly from the ledge 62. An upper outer groove or slot 65 is defined between the lip 63 and an outer surface 57 of the insulator upper portion 56. The upper portion 56 includes an upper surface 66. The upper portion 56 also includes an upper channel 68 that is sized and configured to receive and hold a conductor or bus bar. Inwardly extending projections 70, 72 define an opening 74 to the channel 68.

The central portion 58 of the insulator 52 includes an outer surface 76. Like the upper portion 56 of the insulator 52, the central portion 58 includes a channel 78 that is sized and configured to receive and hold a conductor or bus bar. Projections 80, 82 define an opening 84 to the channel 78.

Similarly, the lower portion 60 of the insulator 52 includes a channel 88 sized and configured to receive and hold a conductor or a bus bar. The channel 88 may be shaped and/or sized differently than the channel 68 and/or the channel 78. Projections 90, 92 define an opening 94 to the channel 88. The lower portion 60 also includes a lower housing alignment and/or engagement feature, shown as a lower ledge 96 with a lip or projection 97 extending upwardly from the ledge 96. A lower outer groove or slot 105 is defined between the lip 97 and an outer surface 61 of the insulator lower portion 60. The lower portion 60 further includes a lower surface 100. The projection 92 has a lip 102, and a lower inner groove or slot 104 is defined between the lower surface 100 and the lip 102.

Figure 7:
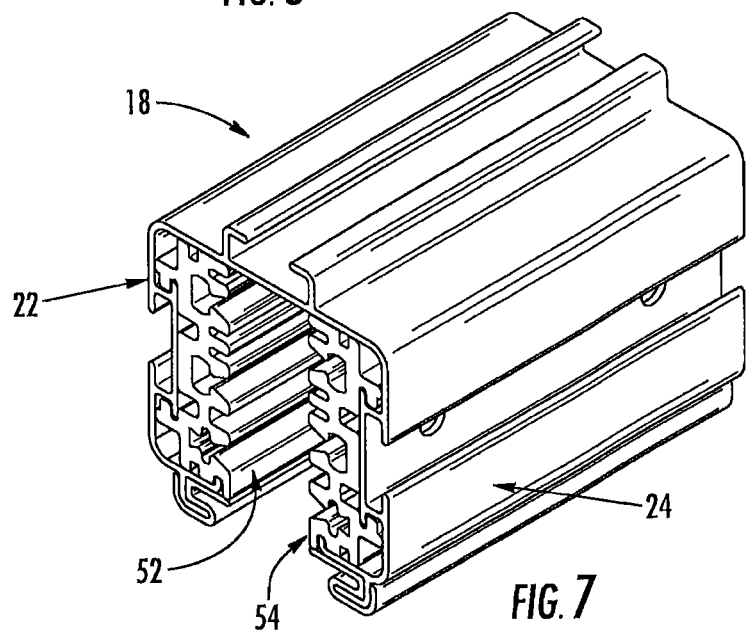
FIG. 7 is a perspective view of a housing holding two insulators of the busway section of FIG. 2.

FIG. 7 is a perspective view illustrating the insulators 52, 54 installed in the housing 18. Specifically, the insulator 52 is installed at the side portion 22 of the housing 18 and the insulator 54 is installed at the opposite side portion 24 of the housing 18. The insulators 52, 54 extend continuously along the housing 18 (i.e., along the entire length L1 or substantially the entire length L1 of the housing 18). In some embodiments, the insulators 52, 54 are slidingly received in the housing 18 in the position shown in FIG. 7. The insulators 52, 54 may be slidingly received in the housing 18 in a direction that is parallel or generally parallel to the housing longitudinal axis A1 (FIG. 3).

Figure 8:
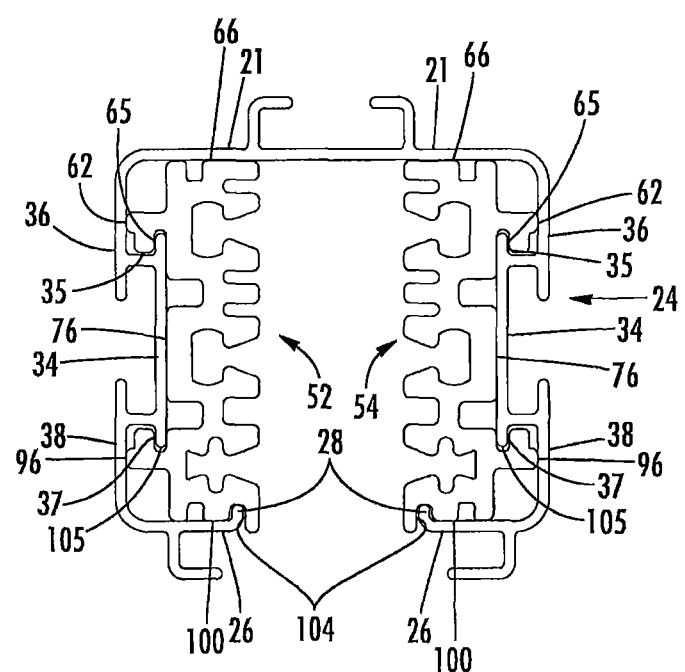
FIG. 8 is an end view of the housing holding the two insulators of FIG. 7.

Turning to FIG. 8, the housing 18 and the insulators 52, 54 are shaped and configured and have features such that the insulators 52, 54 can be aligned with the housing 18, guided into the housing 18 and held in place (e.g., securely held in place) in the housing 18. The upper legs 35 of the housing 18 are received in the upper outer grooves 65 of insulators 52, 54. The lower legs 37 of the housing 18 are received in the lower outer grooves 105 of the insulators 52, 54. The housing lips 28 are received in the lower inner insulator grooves or slots 104.

In position, the insulators 52, 54 are securely held in the housing 18. The insulators 52, 54 may be held in the housing 18 with an interference fit. Various portions of the insulators 52, 54 may be adjacent and/or abut the housing 18. As shown in FIG. 8, the insulator upper surfaces 66 are adjacent and/or abut the housing upper wall 21. The insulator upper ledges 62 are adjacent and/or abut the housing upper outer walls 36. The insulator lower outer ledges 96 are adjacent and/or abut the housing lower outer walls 38. The insulator central portion outer surfaces 76 are adjacent and/or abut the housing inner walls 34. The insulator lower surfaces 100 are adjacent and/or abut the housing lower ledges 26.

The shape of the housing 18 and the insulators 52, 54 facilitate a relatively lightweight and mechanically secure busway section design. Also, as can be seen in FIG. 8, a plurality of air gaps are defined between the housing 18 and the insulators 52, 54. These air gaps may provide a cooling path for increased efficiency.

The insulators 52, 54 may be formed of any suitable electrically insulative material. According to some embodiments, the insulators 52, 54 are formed of a polycarbonate or a thermoplastic polycarbonate. The insulators 52, 54 may be formed of Lexan™ available from SABIC (e.g., Lexan 935A).

Referring again to FIG. 2, the busway section 12 includes a plurality of conductors or bus bars 110, 112, 114, 116, 118. The conductors or bus bars 110, 112, 114, 116, 118 may be formed of any suitable electrically conductive material; an exemplary suitable material is copper.

Figure 9:
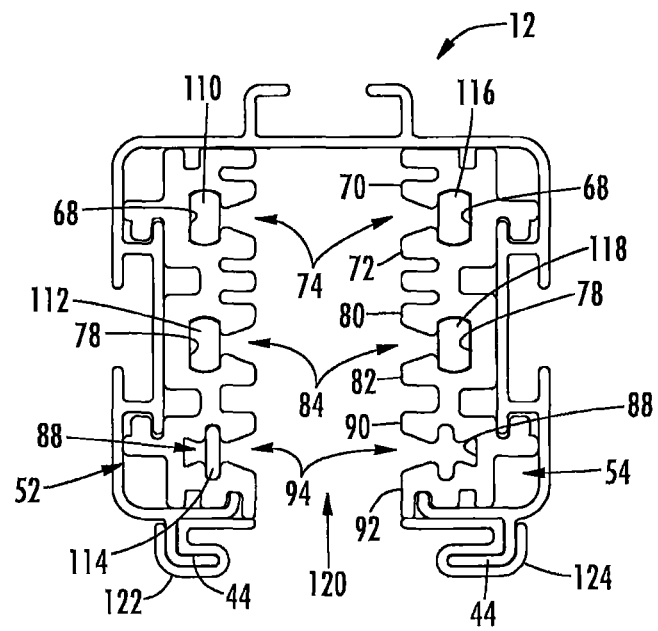
FIG. 9 is an end view of the busway section of FIG. 2.

Turning to FIG. 9, the conductors or bus bars are received in channels defined in 5 the insulators 52, 54. The conductors 110, 112 and 114 are received in the channels 68, 78 and 88 of the insulator 52, respectively. The conductors 116 and 118 are received in the channels 68 and 78 of the insulator 54, respectively. In some embodiments, one of the conductors 114 is also received in the channel 88 of the insulator 54.

The conductors 110, 112 and 116 may be phase conductors or bus bars, the conductor 114 may be a ground conductor or bus bar, and the conductor 118 may be a neutral conductor or bus bar. Such a configuration can be used for a three phase busway system, although other configurations are contemplated including single phase and two phase busway systems.

The housing 18 and the insulators 52, 54 define a channel 120 in which plug-in units can be received and engage the conductors 110, 112, 114, 116, 118. The channel 120 is continuous along the length L1 of the housing 18 (FIG. 3) such that the busway section 12 can be used with a continuous plug-in busway system.

All of the conductors on one side of the busway section 12 are held in a single one of the insulators 52, 54; this configuration can provide certain advantages. Part count and assembly time may be reduced. Conductor location may be more easily controlled and repeatable. Creepage and clearance distances may also be more accurately controlled. Current leakage may be reduced. Also, as noted above, the continuous insulators may help provide the busway section with increased mechanical stiffness and/or support.

Figure 20:
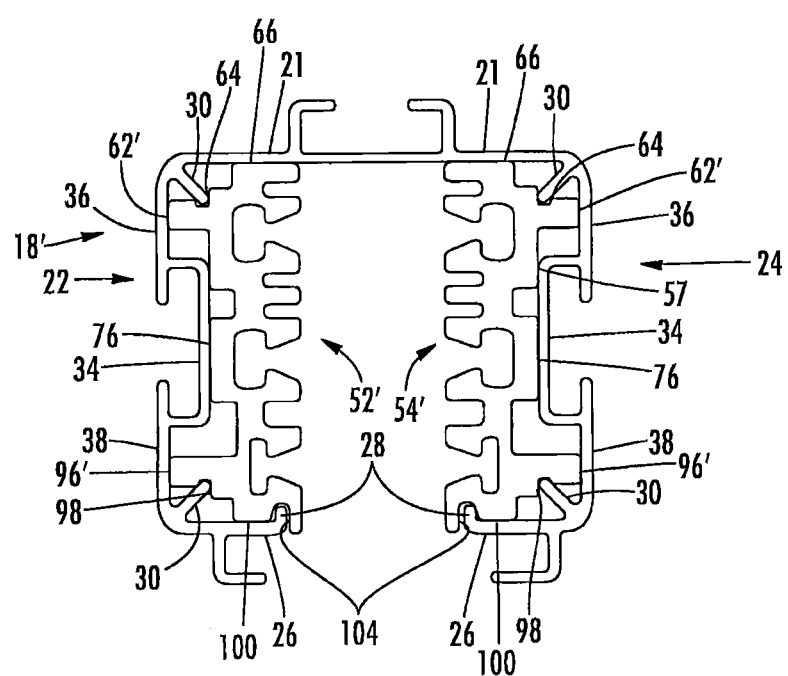
FIG. 20 is an end view of a busway section housing holding two insulators according to some other embodiments.

An alternative design for the housing and insulators is illustrated in FIG. 20. The housing 18' is the same as the housing 18 except as described below, and the insulators 52', 54' are the same as the insulators 52, 54 except as described below. It will be understood that the housing 18' and the insulators 52', 54' may be used in place of the housing 18 and the insulators 52, 54 for the busway section 12.

A track standoff 30 extends inwardly from each corner of the housing 18'. That is, an upper track standoff 30 extends downwardly and inwardly from each upper corner of the housing 18' and a lower track standoff 30 extends upwardly and inwardly from each lower corner of the housing 18'. The standoffs 30 extend the length L1 of the housing 18' (FIG. 3).

The upper portion 56 of the insulators 52', 54' includes a modified upper housing alignment and/or engagement feature or ledge 62'. A groove 64 is defined in the upper ledge 62' and extends along the length of the upper ledge 62'. Similarly, the lower portion 60 of the insulators 52', 54' includes a modified housing alignment and/or engagement feature or ledge 96'. A groove 98 is defined in the lower ledge 96' and extends along the length of the lower ledge 96'.

Like the insulators 52, 54, the insulators 52', 54' have a length that is the same or about the same as the length L1 of the housing 18'. The alignment and/or engagement features 62', 96' extend the entire length or substantially the entire length of the insulators 52', 54'.

It can be seen that the housing 18' and the insulators 52', 54' provide additional and/or alternative features to align and guide the insulators 52', 54' into the housing 18' and to secure the insulators 52', 54' in the housing 18'. The housing upper standoffs 30 are received in the insulator upper grooves 64 and the housing lower standoffs 30 are received in the insulator lower grooves 98.

With the insulators 52', 54' received in the housing 18', a respective upper housing engagement feature 62' is adjacent and/or abuts a respective housing upper outer wall 36. The outer surface 57 of a respective insulator upper portion 56 is adjacent and/or abuts a respective housing inner wall 34.

Also, a respective lower housing engagement feature 96' is adjacent and/or abuts a respective housing lower outer wall 38.

It will be appreciated that the housing 18' and the insulators 52', 54' may include several of the alignment and engagement features described above in reference to the housing 18 and the insulators 52, 54. For example, referring to FIG. 8, the housing lips 28 may be received in the insulator lower inner grooves 104, the outer surface 76 of the insulator central or middle portion 58 may be adjacent and/or abut the housing inner wall 34, the insulator lower surface 100 of the insulator lower portion 60 may be adjacent and/or abut the housing lower ledge 26 and/or the insulator upper surface 66 of the insulator upper portion 56 may be adjacent and/or abut the housing upper wall 21.

Figure 10:
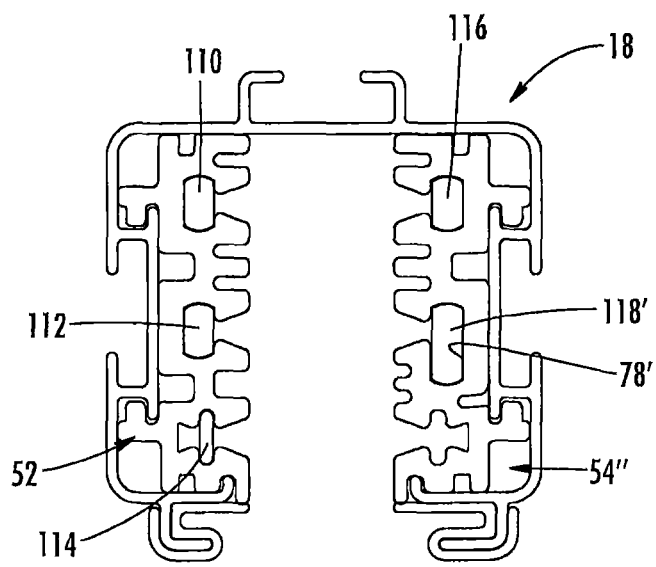
FIG. 10 is an end view of the busway section of FIG. 2 with an enlarged neutral bus bar.

Turning now to FIG. 10, an insulator 54" is shown received in the housing 18. The insulator 54" is the same as the insulator 54 with the exception of a larger channel 78' to accommodate a larger or oversized neutral conductor or bus bar 118' for a 150% neutral rating, for example. Other configurations, such as 200% neutral, are contemplated. Some known busway systems use multiple bus bars (e.g., a double bar configuration) to achieve a higher neural rating.

The modified insulator 54" to accommodate the enlarged neutral bus bar is shaped and configured to be received in the housing 18 in the same way as the insulator 54. That is, the same housing 18 can be used to accommodate either the insulator 54 or the insulator 54" depending on the desired neutral rating.

Referring back to FIG. 2, the busway section 12 may include first and second finger safe lip seals 122, 124. As illustrated in FIG. 9, the seals 122, 124 are shaped and configured to be received along the lower flanges 44 of the housing 18. The seals 122, 124 are formed of an electrically insulative material and provide a safety feature to help prevent or reduce the likelihood of contact with the housing 18 and/or the conductors 110, 112, 114, 116, 118 during installation or maintenance or when installing a plug-in device in the channel 120.

The seals 122, 124 may be used so that the busway system complies with safety regulations such as the Underwriters Laboratories (UL) "Finger Safe Probe" standard. This test is to help prevent accidental human interaction with the powered duct which may result in serious injury or death. The test determines whether a finger is able to make contact with a live conductor or the metallic housing. Some known busway systems do not include such finger safe seals and instead rely on paint thickness for protection.

In contrast to paint, the finger safe seals 122, 124 will not easily chip, degrade and/or wear over time. The seals 122, 124 may be formed of any suitable electrically insulative material. According to some embodiments, the seals 122, 124 are formed of a polycarbonate or a thermoplastic polycarbonate. The seals 122, 124 may be formed of Lexan™ available from SABIC.

Referring now to FIGS. 11-14, the joint assembly 16 (also referred to as a bridge joint assembly) includes first and second electrically insulative housings 130, 132. The housings 130, 132 may also be referred to as the joint insulators 130, 132. The joint assembly also includes a plurality of conductors or bus bars 134, 136, 138, 140 and 142 that are sized and configured to be held in the housings 130, 132. Specifically, each of the housings 130, 132 includes channels 144, 146, 148, 150 and 152 that are sized and configured to receive and hold the conductors 134, 136, 138, 140 and 142, respectively.

The housings 130, 132 may be formed of any suitable electrically insulative material. According to some embodiments, the housings 130, 132 are formed of a polycarbonate or a thermoplastic polycarbonate. The housings 130, 132 may be formed of Lexan™ available from SABIC (e.g., Lexan 3412ECR). The conductors 134, 136, 138, 140 and 142 may be formed of any suitable electrically conductive material; an exemplary suitable material is copper.

The channels 144, 146, 148, 150 and 152 are at least partially defined in elongated conductor holding members 154, 156, 158, 160 and 162, respectively. Adjacent to or integrated with the conductor holding members 154, 156, 158, 160 and 162 are insulator engagement features. The insulator engagement features are configured to engage and/or be received in portions of the insulators 52, 54 of the busway section 12 (FIG. 9), as will be described in more detail below.

Slots 174, 176, 178, 180 and 182 are at distal end portions of the channels 144, 146, 148, 150 and 152, respectively, as well as at distal end portions of the conductor holding members 154, 156, 158, 160 and 162, respectively. As described in additional detail below, the slots 174, 176, 178, 180 and 182 partially expose the conductors 134, 136, 138, 140 and 142 that are received in the channels 144, 146, 148, 150 and 152. The slots 174, 176, 178, 180 and 182 are tapered as they extend in a direction away from a base 186 of the housing 130 and in a direction away from a base 188 of the housing 132. In this regard, the conductor holding members 154, 156, 158, 160 and 162 narrow as they extend away from the base 186 of the housing 130 and as they extend away from the base 188 of the housing 132.

Figure 13:
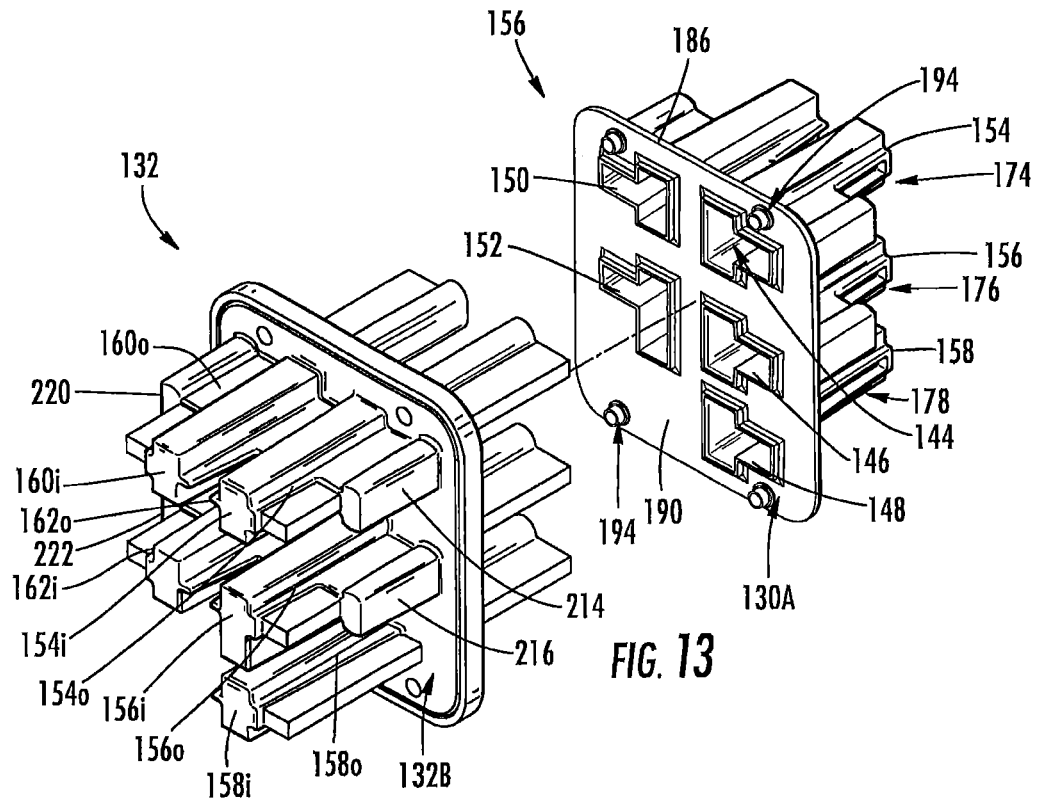
FIG. 13 is a partially assembled opposite perspective view of the joint assembly of FIG. 11.

More specifically, and referring to FIG. 13, the conductor holding member 154 includes an inner portion 154$i$ and an outer portion 154$o$, the conductor holding member 156 includes an inner portion 156$i$ and an outer portion 156$o$, the conductor holding member 158 includes an inner portion 158$i$ and an outer portion 158$o$, the conductor holding member 160 includes an inner portion 160$i$ and an outer portion 160$o$, and the conductor holding member 162 includes an inner portion 162$i$ and an outer portion 162$o$. The slots 174, 176, 178, 180 and 182 are defined in the conductor holding member outer portions 154$o$, 156$o$, 158$o$, 160$o$ and 162$o$. The insulative material of these outer portions taper along with the slots. Accordingly, the conductor holding member outer portions 154o, 156o, 158o, 160o and 162o may be referred to as tapered portions of the conductor holding members 154, 156, 158, 160 and 162.

The housing 130 has first and second opposing sides 130A, 130B and the housing 132 has first and second opposing sides 132A, 132B. The first side 130A of the housing 130 is on one side of the base 186 and the second side 130B of the housing 130 is on the other side of the base 186. Similarly, the first side 132A of the housing 132 is on one side of the base 188 and the second side 132B of the housing 132 is on the other side of the base 188. The conductors 134, 136, 138, 140 and 142 are received in the channels 144, 146, 148, 150 and 152 at the housing first sides 130A, 132A. The conductors 134, 136, 138, 140 and 142 are held in the conductor holding members 154, 156, 158, 160 and 162 at the housing second sides 130B, 132B. A portion of each conductor 134, 136, 138, 140 and 142 extends through and is exposed by the slots 174, 176, 178, 180 and 182 at the housing second sides 130B, 132B.

Figure 12:
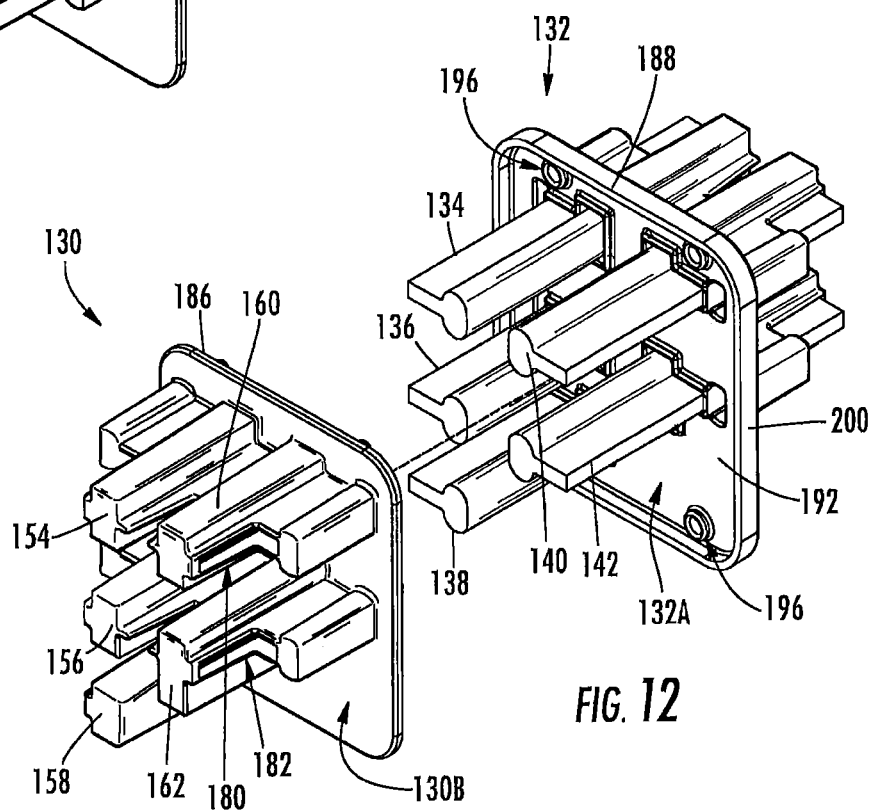
FIG. 12 is a partially assembled perspective view of the joint assembly of FIG. 11.

FIGS. 12 and 13 illustrate the conductors 134, 136, 138, 140 and 142 received in the housing 132. The housing 130 can be coupled to the housing 132 by aligning and receiving the conductors 134, 136, 138, 140 and 142 in the channels 144, 146, 148, 150 and 152 of the housing 130. The housings 130, 132 may include additional alignment and/or engagement features. For example, such features may be on the base 186 or on an alignment face 190 of the housing 130 and/or on the base 188 or an alignment face 192 of the housing 132. As illustrated, alignment plug or post members 194 are on the alignment face 190 of the housing 130 and alignment plug receptacles 196 are on the alignment face 192 of the housing 132, with the receptacles 196 sized and configured to receive the plugs 194 as the housings 130, 132 are brought together. The plugs 194 may be tapered such that they narrow as they extend away from the face 190. Alternatively, the receptacles 196 may be tapered such that they narrow toward the face 192.

The base 188 of the housing 132 includes a flange 200 extending outwardly from an outer periphery of the alignment face 192. The flange 200 is sized and configured to receive at least a portion of the base 186 of the housing 130 as the housings 130, 132 are brought together. This may further facilitate proper alignment and coupling of the housings 130, 132.

Referring again to FIGS. 11 and 12, the conductors 134, 136, 138, 140 and 142 and at least a portion of the channels 144, 146, 148, 150 and 152 and/or the conductor holding members 154, 156, 158, 160 and 162 are generally T-shaped (or have a generally T-shaped cross-section or profile). This design may improve thermal performance by increasing surface area (e.g., surface area of the conductor that is substantially surrounded by and/or in contact with the insulative material of the housings 130, 132). The T-shaped design may also provide a repeatable contact between the joint conductors 134, 136, 138, 140 and 142 and the conductors in the busway sections 12, 14 when the joint assembly 16 is connected thereto. The T-shaped design of the conductors may also provide increased mechanical rigidity of the joint assembly 16 (as opposed to flat conductors, for example).

Figure 11:
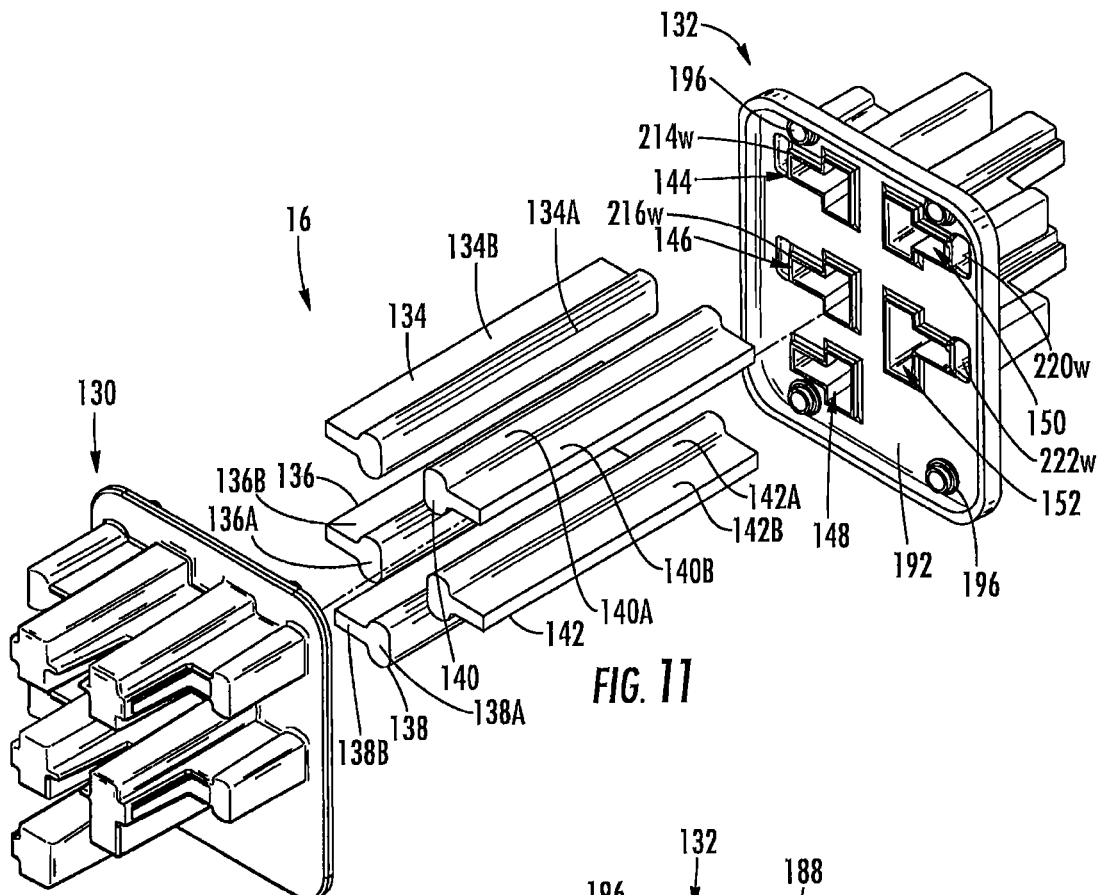
FIG. 11 is an exploded perspective view of a joint assembly according to some embodiments.
Figure 14:
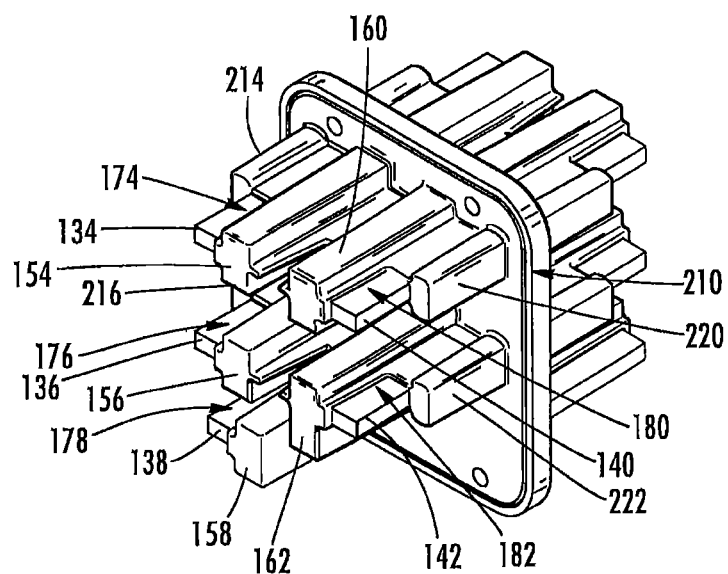
FIG. 14 is an assembled perspective view of the joint assembly of FIG. 11.

The joint assembly 16 is shown in an assembled state in FIG. 14. With reference to FIGS. 11-13, the joint assembly 16 may be mechanically secured by one or more securing features. For example, the conductors 134, 136, 138, 140 and 142 may be received in the channels 144, 146, 148, 150 and 152 of the housings 130, 132 with an interference fit. The T-shaped conductors 134, 136, 138, 140 and 142 may increase mechanical rigidity of the joint due to increased contact area with the channels 144, 146, 148, 150 and 152 of the housings 130, 132. The plugs 194 on the alignment face 190 of the housing 130 may be received in the receptacles 196 on the alignment face 192 of the housing 132 (e.g., with interference fit due to the tapered design of the plugs or the receptacles). The base 186 of the housing 130 may be received in the flange 200 of the housing 132 with an interference fit.

The joint assembly 16 can be assembled without tools. The joint assembly 16 may include only the conductors and insulator housings. The joint assembly 16 may be held together without additional connection features. That is, unlike known joints that require features such as adhesives, clamps, straps and/or fasteners (e.g., bolts, screws and the like), the joint assembly 16 may be assembled and securely held together by one or more interference fits, including those described above.

Referring to FIG. 11, the T-shaped conductors 134, 136, 138, 140 and 142 include first sections 134A, 136A, 138A, 140A and 142A and transverse second sections 134B, 136B, 138B, 140B and 142B. The first sections 134A, 136A, 138A, 140A and 142A may be relatively thicker in a longitudinal direction than the corresponding second sections 134B, 136B, 138B, 140B and 142B. With the joint assembly 16 in its assembled state, the conductor first sections 134A, 136A, 138A, 140A and 142A may be completely or substantially completely enclosed in the housings 130, 132 (e.g., completely or substantially completely enclosed in the channels 144, 146, 148, 150 and 152 of the housings 130, 132). Portions of the conductor second sections 134B, 136B, 138B, 140B and 142B extend through and are exposed by the slots 174, 176, 178, 180 and 182 of the housings 130, 132.

Therefore, the relatively thick conductor first sections 134A, 136A, 138A, 140A and 142A may be held in the conductor holding member inner portions 154i, 156i, 158i, 160i and 162i (and may be enclosed or substantially enclosed by the conductor holding member inner portions 154i, 156i, 158i, 160i and 162i). The relatively thin conductor second sections 134B, 136B, 138B, 140B and 142B may be held in the conductor holding member outer portions 154o, 156o, 158o, 160o and 162o, with a portion of a respective conductor second section 134B, 136B, 138B, 140B and 142B extending through and exposed by a respective slot 174, 176, 178, 180 and 182.

The joint assembly 16 serves to transfer current and voltage across two pieces of the busway system, such as the busway sections 12, 14. The housings 130, 132 substantially surround the conductors 134, 136, 138, 140 and 142 to help mechanically stiffen the joint and to help meet electrical creepage and clearance requirements as set forth by UL standards, International Electrotechnical Commission (IEC) standards and National Electric Code (NEC) standards, for example. Also, as described in more detail below, the joint assembly 16 and the insulators 52, 54 of the busway sections 12, 14 have features and geometries that serve as an alignment guide during the assembly process.

Referring again to FIG. 14, the conductors 134, 136, 138, 140 and 142 extend through their respective slots 174, 176, 178, 180 and 182 to partially expose the conductors 134, 136, 138, 140 and 142. As described above, the slots 174, 176, 178, 180 and 182 are tapered such that the conductor holding members 154, 156, 158, 160 and 162 narrow as they extend away from an interface 210 between the housings 130, 132 (e.g., the mated housing bases 186, 188).

Each housing 130, 132 may include a plurality of insulator channel engagement features shown as outer block members 214, 216, 220 and 222. The block members 214, 216, 220 and 222 extend away from the base 186 of the housing 130 and extend away from the base 188 of the housing 132 in the same direction as the conductor holding members 154, 156, 158, 160 and 162. The block members 214, 216, 220 and 222 are adjacent the conductor holding members 154, 156, 160 and 162, respectively. More specifically, the block members 214, 216, 220 and 222 are adjacent the conductor holding member outer portions 154o, 156o, 160o and 162o, respectively.

In some embodiments, and as illustrated in FIG. 11, the block members 214, 216, 220 and 222 each include a wall 214w, 216w, 220w and 222w adjacent the conductor holding member outer portions 154o, 156o, 160o and 162o, respectively. When installed, the conductors 134, 136, 140 and 142 may be adjacent and/or abut the walls 214w, 216w, 220w and 222w, respectively.

The block members 214, 216, 220 and 222 are sized and configured to be received in the channels 68 and 78 of the busway section insulators 52, 54 (FIG. 9), as will be described in more detail below.

Figure 15:
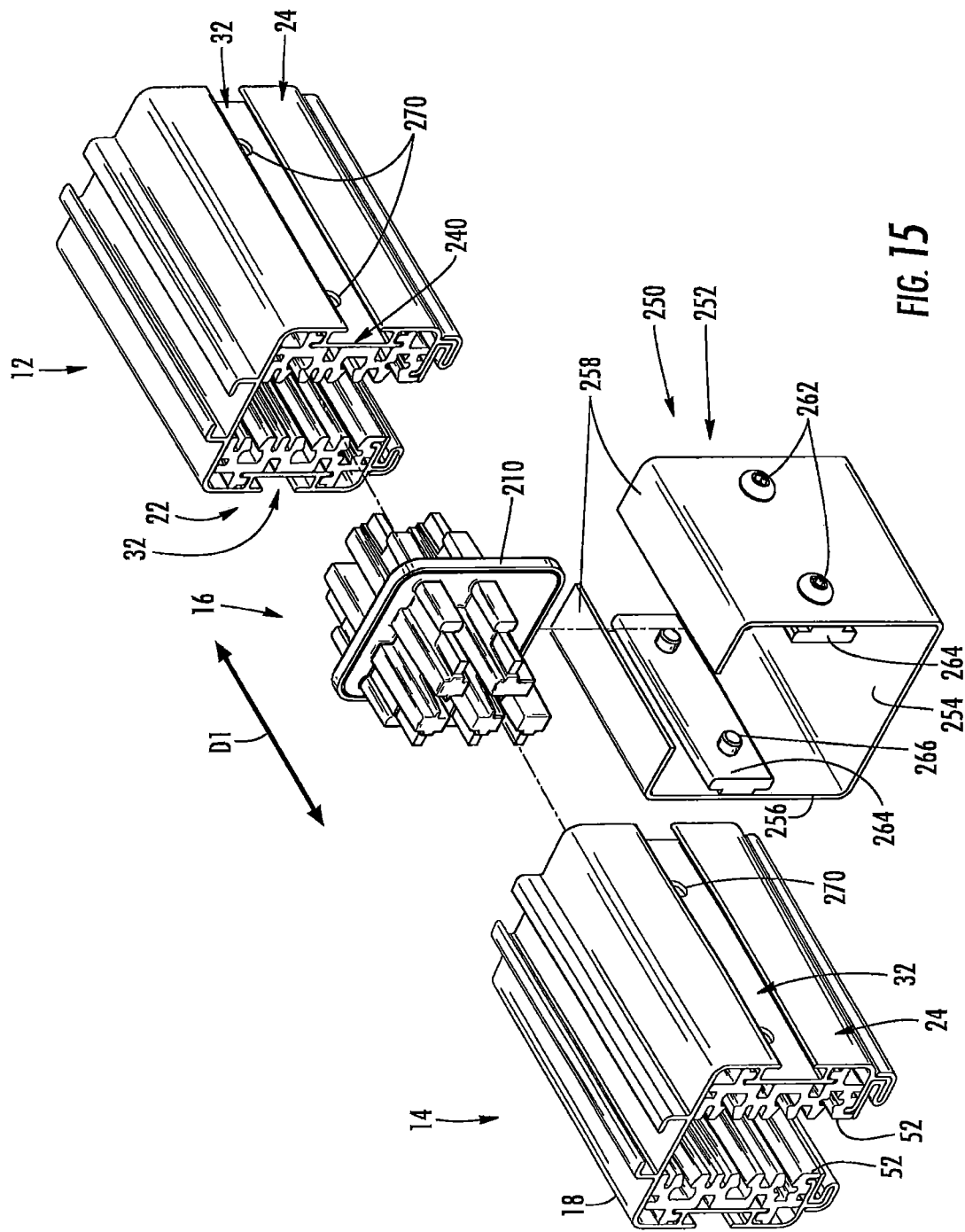
FIG. 15 is a partially assembled perspective view of the busway system of FIG. 1 including first and second assembled busway sections, an assembled joint assembly and a joint cover.
Figure 16:
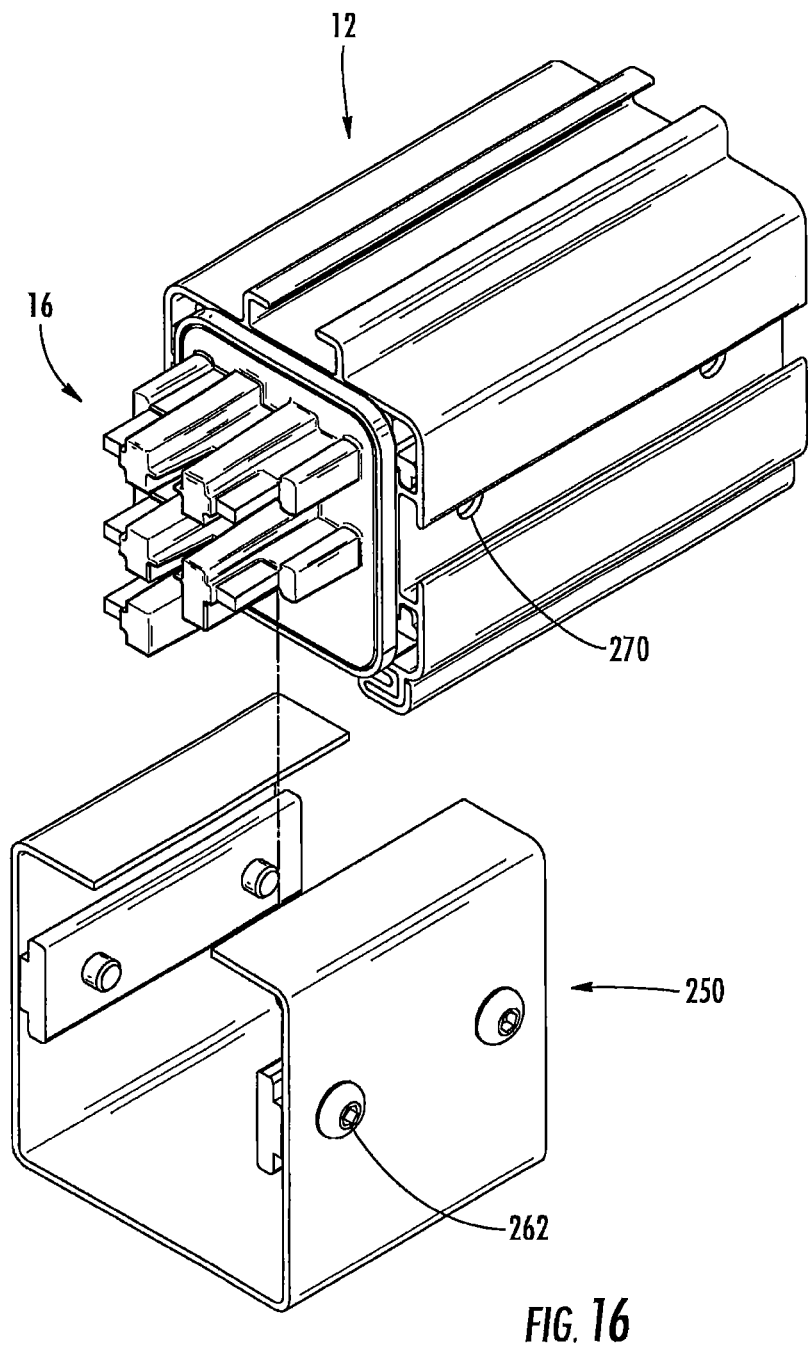
FIG. 16 is a perspective view illustrating the joint assembly connected with the first busway section of FIG. 15.
Figure 19:
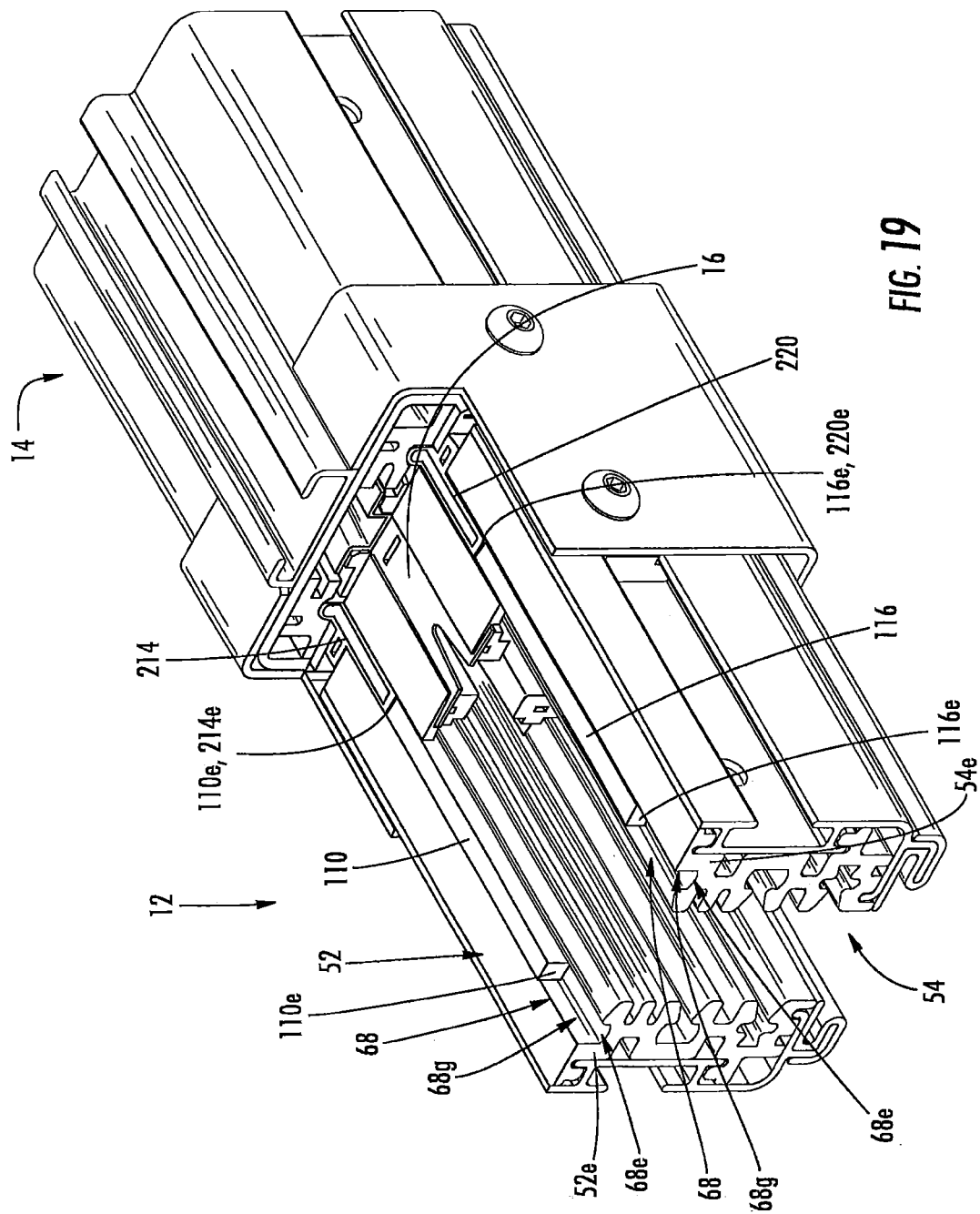
FIG. 19 is an assembled partial cutaway perspective view of the busway system of FIG. 1.

The assembled joint assembly 16 and the assembled busway sections 12, 14 are illustrated in FIG. 15. The joint assembly can be moved toward either of the busway sections 12, 14 as shown by the arrow D1. FIG. 16 illustrates the joint assembly 16 coupled to the busway section 12. With reference to FIGS. 9, 14 and 19, the engagement of the joint assembly 16 and the busway section 12 according to some embodiments will now be described.

As the joint assembly 16 is brought in contact with the busway section 12, the exposed portions of the conductors 134, 136, 138, 140 and 142 of the joint assembly 16 are received in the openings 74, 84 and 94 defined in the insulators 52, 54. The conductors 134, 136, 138, 140 and 142 are electrically connected with the conductors 110, 112, 114, 116 and 118, respectively, that are held by the insulators 52, 54.

A portion of each of the conductor holding members 154, 156, 158, 160 and 162 may also be received in the openings 74, 84 and 94 defined by the insulators 52, 54 as the joint assembly 16 engages the busway section 12. Specifically, at least a portion of the outer or tapered portions 154o, 156o, 158o, 160o and 162o (FIG. 13) may be received in the openings 74, 84, 94. As the conductors and the conductor holding member outer portions are received further in the openings (i.e., as the joint interface 210 is brought closer to an end 240 (FIG. 15) of the busway section 12), the conductor holding member outer portions 154o, 156o, 158o, 160o and 162o may increasingly engage the insulators 52, 54 due to the taper of the outer portions described above. For example, referring to FIGS. 6, 9 and 13, the outer portion 154o may increasingly engage the projection 70 and/or the projection 72 of the insulator 52, the outer portion 156o may increasingly engage the projection 80 and/or the projection 82 of the insulator 52, the outer portion 158o may increasingly engage the projection 90 and/or the projection 92 of the insulator 52, the outer portion 160o may increasingly engage the projection 70 and/or the projection 72 of the insulator 54, and the outer portion 162o may increasingly engage the projection 80 and/or the projection 82 of the insulator 54.

Referring to FIG. 19, the conductors 110 and 116 are shown held in the channel 68 of the insulator 52 and the channel 68 of the insulator 54, respectively. As illustrated, the conductors 110, 116 have a length that is shorter than the length of the insulators 52, 54. Accordingly, open spaces or gaps 68g are defined in end portions of the channels 68 between ends 52e, 54e of the insulators 52, 54 (or ends 68e of the channels 68) and ends 110e, 116e of the conductors 110, 116. The conductors 112, 114 and/or 118 may also be shorter in length than the insulators 52, 54 and corresponding open spaces or gaps may be defined in end portions of the channels 78 and 88 of the insulators 52, 54.

As can be seen from FIG. 19, as the joint assembly 16 engages the busway section 12 (or the busway section 14), the joint assembly block member 214 is slidingly received in the channel 68 of the insulator 52 and the joint assembly block member 220 is slidingly received in the channel 68 of the insulator 54. As the joint assembly 16 and busway section 12 are further brought together, the joint assembly block member 214 is further slidingly received in the channel 68 of the insulator 52 such that an end 214e of the block member 214 is adjacent and/or abuts the end 110e of the conductor 110. When the joint assembly 16 and busway section 12 are fully engaged, the joint assembly block member 214 may fill or substantially fill the gap or open space 68g in the channel 68 of the insulator 52. Similarly, the joint assembly block member 220 is slidingly received in the channel 68 of the insulator 54 such that an end 220e of the block member 220 is adjacent and/or abuts the end 116e of the conductor 116. When the joint assembly 16 and busway section 12 are fully engaged, the joint assembly block member 220 may fill or substantially fill the gap or open space 68g in the channel 68 of the insulator 54.

It will be appreciated that the joint assembly block members 216 and 222 (FIG. 14) may be slidingly received and held in channels of the insulators 52, 54 (FIG. 9) in a similar way. For example, the block member 216 may be sized and configured to be slidingly received in the channel 78 of the insulator 52 such that, when the joint assembly 16 and busway section 12 are fully engaged, an end of the block member 216 is adjacent and/or abuts an end of the conductor 112. Similarly, the block member 222 may be sized and configured to be slidingly received in the channel 78 of the insulator 54 such that, when the joint assembly 16 and busway section 12 are fully engaged, an end of the block member 222 is adjacent and/or abuts an end of the conductor 118.

Also, when the busway section 12 and the joint assembly 16 are coupled, the inner portions of the conductor holding members 154, 156, 158, 160 and 162 may be adjacent and/or abut the insulators 52, 54. For example, the inner portion 154i may be adjacent and/or abut the projection 70 and/or the projection 72 of the insulator 52, the inner portion 156i may be adjacent and/or abut the projection 80 and/or the projection 82 of the insulator 52, the inner portion 158i may be adjacent and/or abut the projection 90 and/or the projection 92 of the insulator 52, the inner portion 160i may be adjacent and/or abut the projection 70 and/or the projection 72 of the insulator 54, and the inner portion 162i may be adjacent and/or abut the projection 80 and/or the projection 82 of the insulator 54.

It will be appreciated that various features and geometry of the housing 18, the insulators 52, 54 and the joint assembly 16 may help facilitate alignment of the joint 16 and the busway section 12. These features may also help facilitate a tight mechanical connection between the joint assembly 16 and the busway section 12. These features may further help provide an improved electrical connection between the busway section 12 and the joint 16 (as well as between busway sections that are connected by the joint, such as the busway sections 12, 14 connected by the joint 16).

Figure 17:
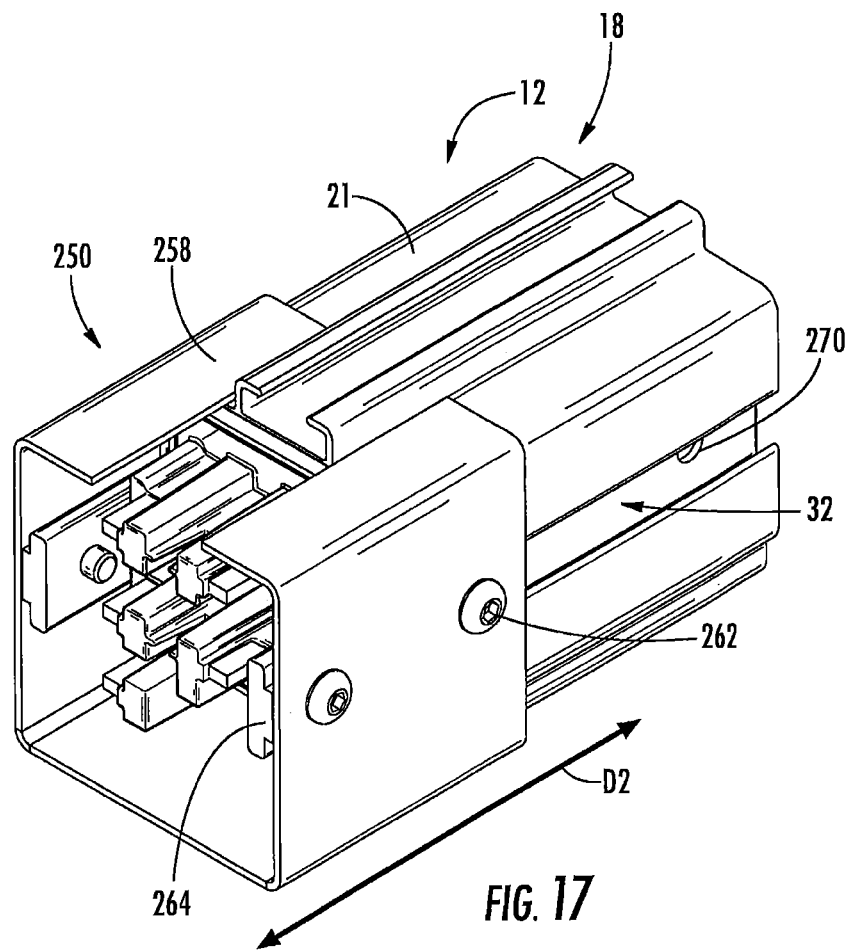
FIG. 17 is a perspective view illustrating the joint cover engaged with the first busway section of FIG. 15.

A joint cover or joint cover assembly 250 is illustrated in FIGS. 15-17. The joint cover 250 includes a housing 252. The housing 252 includes a bottom or lower wall 254, a pair of opposed sidewalls 256, and a pair of opposed top or upper ledges 258, with one of the ledges 258 extending from each sidewall 256. Each of the sidewalls 256 includes a pair of apertures 260 (FIG. 1), through which a fastener 262 may be received and connect to a rail 264. The rails 264 are shaped, sized and configured to fit and slide within the channels 32 of the housing side portions 22, 24. The rails 264 may be generally T-shaped so that the rail 264 is retained in the channel 32 (while also being slidable in the channel).

Each of the fasteners has a distal end portion 266 that can be received in an aperture 270 in the housing channel 32. Referring to FIG. 17, joint cover 250 can be coupled to the busway section 12 by aligning the rails 264 with the channels 32 and then receiving the rails 264 in the channels 32. The upper ledges 258 of the joint cover 250 rest on the top wall 21 of the busway section housing 18. The position of the joint cover 250 can be adjusted by sliding the joint cover 250 in either direction shown by the arrow D2. The fasteners 262 can be aligned with apertures 270 and then tightened to lock or secure the joint cover 250 in place.

Figure 18:
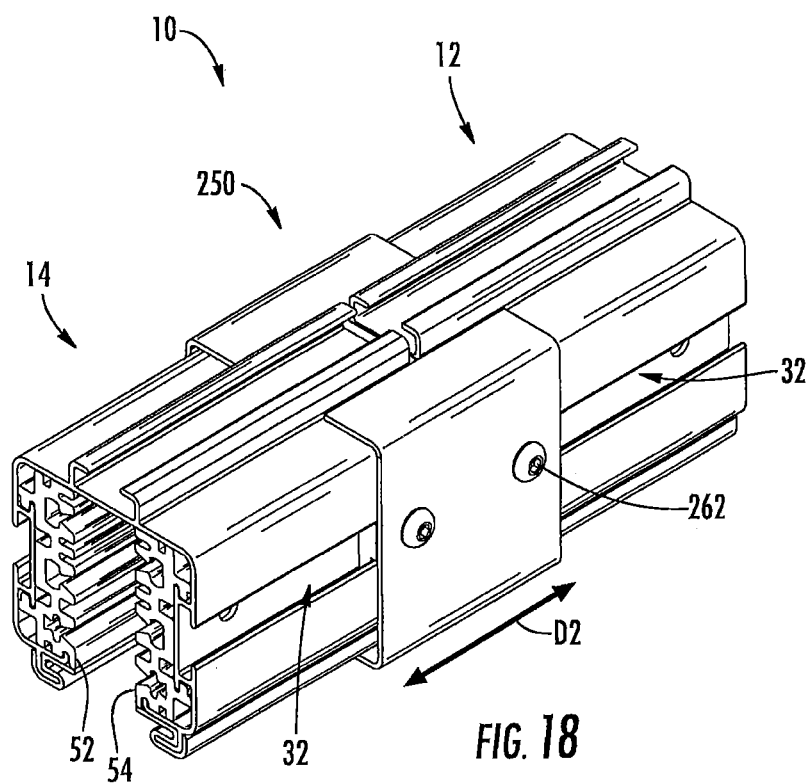
FIG. 18 is an assembled perspective view of the busway system of FIG. 1.

FIG. 18 illustrates the busway system 10 in an assembled state with the joint cover 250 coupled to the first and second busway sections 12, 14 that are electrically and mechanically connected by the joint assembly 16. The joint 16 and the busway section 14 may be aligned and coupled in the same way as described above in reference to the joint 16 and the busway section 12. The position of the joint cover 250 can be adjusted by loosening the fasteners 262 and sliding the joint cover 250 in either direction as shown by the arrow D2.

Therefore, the joint cover 250 does not require assembly and/or disassembly during installation or maintenance procedures, for example. When the fasteners 262 are loosened, the cover 250 is slidable axially down the busway. This design is convenient and useful during installation and maintenance procedures, and reduces the likelihood that parts may be damaged or lost. Some known joint covers need to be disassembled and removed prior to maintenance of the busway sections and/or the joint.

The joint cover 250 can provide additional advantages. The cover may help further mechanically fasten two sections of the busway together. For example, when the fasteners are tightened, the cover 250 may apply pressure to the housing 18 and/or the insulators 52, 54 of the busway sections 12, 14 and/or the insulating housings 30, 32 of the joint assembly 16 for a more secure mechanical connection. This may also increase contact pressure between the conductors in the busway sections 12, 14 and/or the conductors in the joint assembly 16 for increased electrical efficiency. Moreover, the rails 264 may serve as ground blocks (e.g., T-shaped ground blocks) to create and maintain a housing ground path. That is, when the joint cover 250 is installed for operation, the ground block or rails 264 may form a housing ground path between adjacent busway sections 12, 14.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A busway assembly comprising:
   a first busway section comprising a first busway section housing including first and second opposite side portions;
   a second busway section comprising a second busway section housing including first and second opposite side portions;
   a joint assembly configured to be positioned between and to couple the first and second busway sections; and
   a joint cover comprising a joint cover housing configured to be positioned over the joint assembly and the first and second busway section housings when the first and second busway sections are coupled by the joint assembly, the joint cover being slidable axially along the first and second busway section housings,
   wherein a first aperture is defined in the first side portion of each of the first and second busway section housings, a second aperture is defined in the second side portion of each of the first and second busway section housings, and wherein the joint cover is configured to be coupled to the first and second busway section housings using a plurality of first fasteners that extend through the joint cover housing and through the first apertures and a plurality of second fasteners that extend through the joint cover housing and through the second apertures.

2. The busway assembly of claim 1 wherein the joint cover housing is a one-piece joint cover housing.

3. The busway assembly of claim 1 wherein the joint cover comprises a joint cover housing comprising first and second sidewalls, a lower wall extending between and connecting the first and second sidewalls, a first upper flange extending inwardly from the first sidewall, and a second upper flange extending inwardly from the second sidewall.

4. The busway assembly of claim 1 wherein the first and second busway section housings each comprise a first channel at the first side portion thereof and a second channel at the second side portion thereof, and wherein the assembly comprises a first rail member on the joint cover housing that is configured to be slidingly received in the first channels and a second rail member on the joint cover housing that is configured to be slidingly received in the second channels.

5. The busway assembly of claim 4 wherein the first and second rail members each extend along at least a major portion of a length of the joint cover housing.

6. The busway assembly of claim 4 wherein the first rail member is on a first sidewall of the joint cover housing and the second rail member is on a second, opposite sidewall of the joint cover housing.

7. The busway assembly of claim 6 wherein:
   the first rail member is generally T-shaped with a narrow portion adjacent the first sidewall and a wide portion configured to be slidingly received in the first channels of the first and second busway section housings; and
   the second rail member is generally T-shaped with a narrow portion adjacent the second sidewall and a wide portion configured to be slidingly received in the second channels of the first and second busway section housings.

8. The busway assembly of claim 6 wherein the first rail member is coupled to the first sidewall and the second rail member is coupled to the second sidewall.

9. The busway assembly of claim 6 wherein:
each first fastener extends through an aperture defined in the first sidewall of the joint cover and through the first rail member; and
each second fastener extends through an aperture defined in the second sidewall of the joint cover and through the second rail member.

10. A joint cover for use with a busway assembly comprising a first busway section including a first busway section housing, a second busway section including a second busway section housing, and a joint assembly configured to be positioned between and couple the first busway section and the second busway section, the joint cover comprising:
a joint cover housing configured to be positioned over the joint assembly and the first and second busway section housings when the first and second busway sections are coupled by the joint assembly, the joint cover housing being slidable axially along the first and second busway section housings,
wherein the joint cover housing comprises first and second opposite sidewalls, the joint cover further comprising a first rail member on the first sidewall and a second rail member on the second sidewall, wherein the first rail member is configured to be slidingly received in channels at first side portions of the first and second busway section housings and the second rail member is configured to be slidingly received in channels at second, opposite side portions of the first and second busway section housings,
wherein the joint cover housing comprises a first upper ledge extending inwardly from the first sidewall and a second upper ledge extending inwardly from the second sidewall, and wherein the first and second ledges are configured to slide above and/or on upper walls of the first and second busway section housings.

11. The joint cover of claim 10 wherein:
first and second apertures are defined in the first sidewall;
first and second apertures are defined in the second sidewall;
the joint cover housing is configured to be coupled to the first busway section using: (i) a first fastener that extends through the first aperture in the first sidewall, through the first rail member, and through an aperture defined in the first side portion of the first busway section housing; and (ii) a second fastener that extends through the first aperture in the second sidewall, through the second rail member, and through an aperture defined in the second side portion of the first busway section housing; and
the joint cover housing is configured to be coupled to the second busway section using: (i) a third fastener that extends through the second aperture in the first sidewall, through the first rail member, and through an aperture defined in the first side portion of the second busway section housing; and (ii) a fourth fastener that extends through the second aperture in the second sidewall, through the second rail member, and through an aperture defined in the second side portion of the second busway section housing.

12. The joint cover of claim 10 wherein:
the first rail member is generally T-shaped with a narrow portion adjacent the first sidewall and a wide portion configured to be slidingly received in the channels at the first side portions of the first and second busway section housings; and
the second rail member is generally T-shaped with a narrow portion adjacent the second sidewall and a wide portion configured to be slidingly received in the channels at the second side portions of the first and second busway section housings.

13. The joint cover of claim 10 wherein the joint cover housing is monolithic.

14. The joint cover of claim 10 wherein the joint cover housing comprises a lower wall extending between and connecting the first and second sidewalls.

15. A method for assembling a busway assembly, the method comprising:
coupling a joint assembly to an end of a first busway section comprising a first busway section housing;
coupling a second busway section comprising a second busway section housing to the joint assembly; and
sliding a joint cover along the first busway section and/or the second busway section and over the joint assembly such that the joint cover is over the first busway section housing and the second busway section housing;
wherein the joint cover comprises a joint cover housing comprising first and second sidewalls, a lower wall extending between and connecting the first and second sidewalls, a first upper flange extending inwardly from the first sidewall, and a second upper flange extending inwardly from the second sidewall, and
sliding the joint cover along the first busway section and/or the second busway section comprises (i) sliding the first upper flange and the second upper flange above or on an upper wall of the first busway section housing and/or (ii) sliding the first upper flange and the second upper flange above or on an upper wall of the second busway section housing.

16. The method of claim 15 further comprising sliding the joint cover over the first busway section before coupling the second busway section to the joint assembly.

17. The method of claim 15 wherein:
the joint cover comprises a first rail on the first sidewall, and a second rail on the second sidewall;
the first busway section housing comprises a first channel at a first side portion thereof and a second channel at a second side portion thereof;
the second busway section housing comprises a first channel at a first side portion thereof and a second channel at a second side portion thereof;
sliding the joint cover along the first busway section and/or the second busway section comprises (i) sliding the first rail in the first channel of the first busway section housing and sliding the second rail in the second channel of the first busway section housing and/or (ii) sliding the first rail in the first channel of the second busway section housing and sliding the second rail in the second channel of the second busway section housing.

18. The method of claim 15 wherein:
the joint cover comprises a first rail on the first sidewall, and a second rail on the second sidewall;
the method comprises coupling the joint cover to the first and second busway sections including:
advancing a first fastener through a first aperture defined in the joint cover housing, through the first rail, and into a first aperture defined in the first busway section housing;
advancing a second fastener through a second aperture defined in the joint cover housing, through the second rail, and into a second aperture defined in the first busway section housing;
advancing a third fastener through a third aperture defined in the joint cover housing, through the first rail, and into a first aperture defined in the second busway section housing; and advancing a fourth fastener through a fourth aperture defined in the joint cover housing, through the second rail, and into a second aperture defined in the second busway section housing.

19. The method of claim 15 further comprising coupling the joint cover to the first and second busway sections including:

advancing a first fastener through a first aperture defined in the joint cover housing and into a first aperture defined in the first busway section housing;

advancing a second fastener through a second aperture defined in the joint cover housing and into a second aperture defined in the first busway section housing;

advancing a third fastener through a third aperture defined in the joint cover housing and into a first aperture defined in the second busway section housing; and advancing a fourth fastener through a fourth aperture defined in the joint cover housing and into a second aperture defined in the second busway section housing.

20. The method of claim 15 wherein the joint cover housing is monolithic.

\* \* \* \* \*